4551/6

United States Patent

Jeffers

[15] 3,665,316

[45] May 23, 1972

[54] MAXIMUM CHANNEL UTILIZATION USING SINGLE ENDED AMPLIFIERS IN A FREQUENCY BAND GREATER THAN ONE OCTAVE

[72] Inventor: Michael F. Jeffers, Flourtown, Pa.

[73] Assignee: Jerrold Electronics Corporation, Hatboro, Pa.

[22] Filed: July 6, 1970

[21] Appl. No.: 52,511

[52] U.S. Cl. .....................325/308, 178/DIG. 3, 179/15 AN, 179/15 FE, 179/15 BW, 325/371, 325/373, 325/431, 325/472, 325/474, 325/11, 328/104

[51] Int. Cl. ..........................................................H04b 1/06

[58] Field of Search........325/11, 31, 65, 309, 308, 365–368, 325/371, 373–375, 388, 430, 431, 435–437, 442, 479, 472–474, 9; 178/6 PD, 5.8 A, DIG. 3; 179/15 R, 15 AN, 15 BW, 15 FE, 1 B; 328/104

[56] References Cited

UNITED STATES PATENTS

| | | | |
|---|---|---|---|
| 2,571,137 | 10/1951 | Hotine | 325/308 |
| 3,130,367 | 4/1964 | Fisher | 325/308 |
| 3,480,733 | 11/1969 | Morita et al. | 325/65 |

*Primary Examiner*—Robert L. Griffin
*Assistant Examiner*—Albert J. Mayer
*Attorney*—Sandoe, Hopgood & Calimafde

[57] ABSTRACT

A CATV system is disclosed in which the channels are assigned so that all second order distortion components fall within a sideband in a TV channel, such that the resulting interference is not perceptible to the eye. The channel assignment is selected by utilizing odd multiples of the sideband frequency as the video carrier for each channel.

10 Claims, 3 Drawing Figures

INVENTOR.
MICHAEL F. JEFFERS
BY
Sandoe, Hopgood & Calimafde
ATTORNEYS

INVENTOR
MICHAEL F. JEFFERS
BY
Sandoe, Hopgood & Calimafde
ATTORNEYS

MAXIMUM CHANNEL UTILIZATION USING SINGLE ENDED AMPLIFIERS IN A FREQUENCY BAND GREATER THAN ONE OCTAVE

The present invention relates generally to communications systems, and particularly to a frequency allocation or assignment system for a CATV system in which optimum use is made of the available channels.

In CATV systems, commercial broadcast television signals are received at a central antenna, processed and combined at a head end system, and then retransmitted such as over a cable to receivers located in the homes of the CATV subscribers. In the head end processing operation, the received television signals are amplified in a single ended amplifier which produces second order distortion products of these signals such as the sum and difference frequencies of the individual channel carrier frequencies.

For this reason, the known multichannel CATV transmission systems commonly provide guard bands between the broadcast channels such that the second order sum and difference beat frequencies and harmonics fall within these guard bands. For example, for a channel frequency assignment of 6 MHz, 18 MHz, 30 MHz, 42 MHz, etc., the sum beat of the 6 MHz and 18 MHz channel will occur at 24 MHz which falls between the guard bands of those channels having video carrier frequencies of 18 MHz and 30 MHz. Similarly, the difference beat frequency between 42 MHz and 18 MHz also falls within the 24 MHz guard band. Similar computations would reveal that all sum and difference beat frequency signals of the carriers fall within one of the guard bands provided between the channels.

While this frequency allocation serves to prevent the sum and difference beat signals from interfering with the broadcast signals, it is, as a result of the need for these guard bands, wasteful of the frequency spectrum available for television broadcasting. For this reason the overall frequency band required to transmit a plurality of broadcast signals, such as signals retransmitted from a CATV head end, is considerable and necessitates the use of equipment capable of operating at high bandwidths. This special equipment adds considerably to the initial costs of the CATV equipment and thus inevitably leads to increased charges for the CATV subscribers.

It is thus an object of the present invention to provide a more efficient use of the available frequency bandwidths for multichannel transmission.

It is another object of the present invention to improve the utilization of the available frequency spectrum in a multichannel transmission system without introducing perceptible interference at the receivers.

It is a further object of the present invention to provide a multichannel transmission system in which all sum and difference beat signals between any two broadcast channels fall within a side band of another of the channels without causing perceptible interference in the latter.

It is a more precise object of the present invention to provide in a CATV system, a channel assignment system in which a greater number of channels can be transmitted over a given frequency bandwidth without causing perceptible interference at the subscriber's receivers.

It is another object of the invention to provide, in a CATV system, a system for channel allocation in which the second order distortion components introduced as a result of the operation of the CATV single ended amplifiers all fall within a predetermined sideband of the desired channel where the resulting interference is not perceptible to the eye.

The channel assignment system of the invention is based on the fact that an interference signal falling within a certain location in the side band of a television channel is for all practical considerations imperceptible to the viewer. Thus, for example, in a conventional 6 MHz channel, interference signals falling within a frequency of 4 MHz or greater in the sideband of the channel is not perceptible. In the present system the video carrier frequencies in each of the channels are selected as odd multiples of the sideband frequency, with the result that all second order distortion products fall within the channels at the noninterference producing sidebands.

In the embodiment of the invention herein described the video carriers are selected as odd multiples of 4.25 MHz, which causes all second order distortion signals to appear 4.25 MHz in the side band of the desired channel. Also disclosed is a special converter to be provided at the subscriber's receivers to convert the specially allocated channel frequency to the standard channel frequencies to thereby permit the reception of the television signal on a standard receiver.

To the accomplishment of the above and to such further objects as may hereinafter appear, the present invention relates to a method for achieving maximum channel utilization using single ended amplifiers substantially as defined in the appended claims and as described in the following specification taken together with the accompanying drawings in which:

The multichannel communications system of the invention allocates television channels such that all second order harmonic products produced during the processing of these channels, such as at a CATV head end, fall within the sideband of a channel such that the resulting interference is for all practical purposes imperceptible. In the system herein described, each channel is 6 MHz wide and the harmonic signals are caused to fall within the 4.25 MHz sideband of the channel. To achieve this operation, the frequency assignment of the video carriers of the allocated channels is based on odd multiples of the side band frequency. The specially allocated channels are each 6 MHz wide and the video carriers in adjacent channels are equally spaced.

Figure 1:
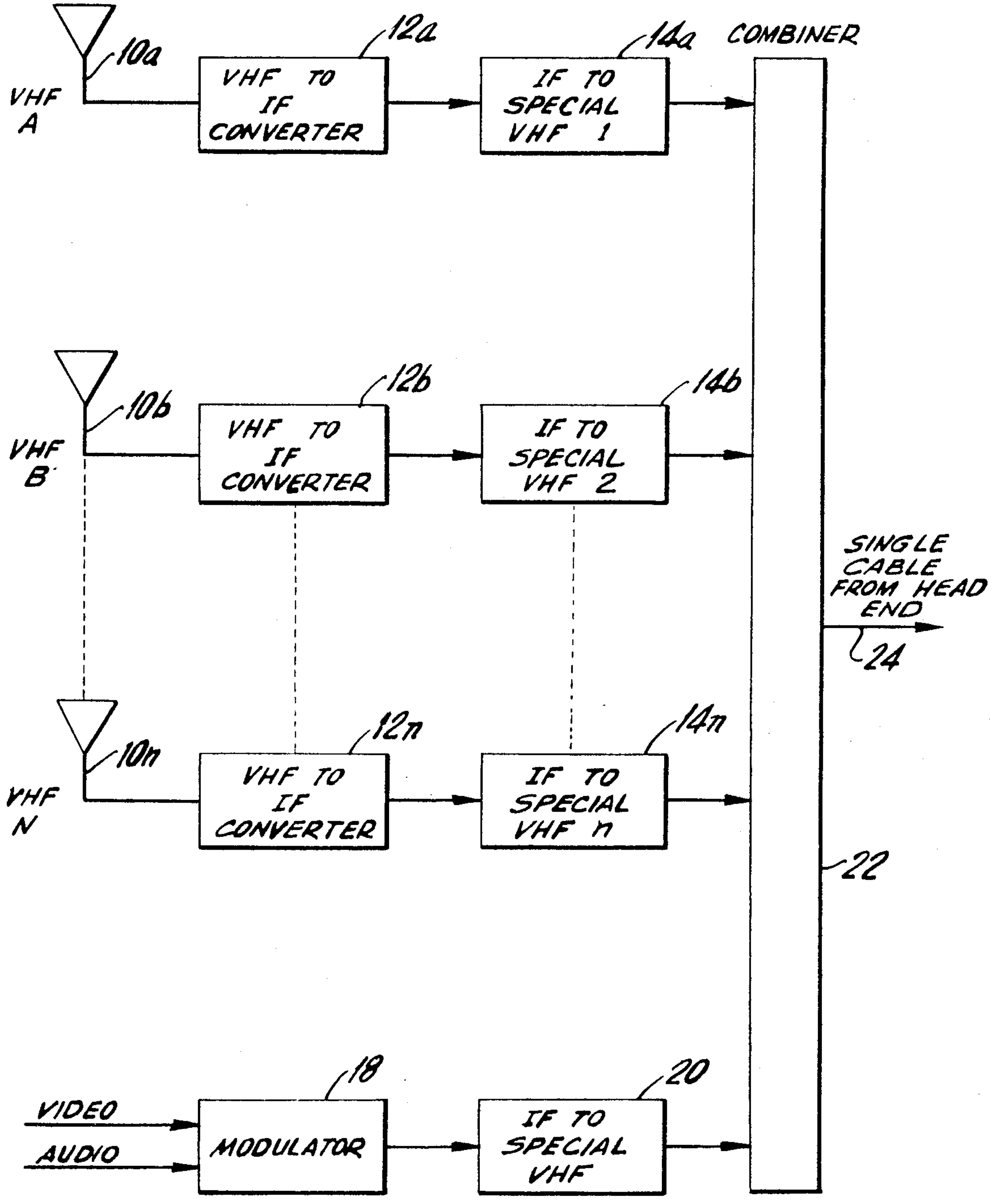
FIG. 1 is a schematic block diagram of a multichannel transmission system in which the channel allocation according to the invention is achieved.

The frequency assignment system for use in a typical CATV head end is illustrated in FIG. 1 in which a plurality of VHF broadcast signals are received as indicated by antennas **10*a*–10, which are preferably all arranged in a common antenna system. The received channels are separately applied to VHF-to-IF converters 12*a*–12*n*** in which the VHF frequencies are heterodyned with a local oscillator to derive the conventional video and audio IF frequencies of 45.75 MHz and 41.25 MHz, respectively.

In accord with the present invention the I.F. signals for each received television signal are all applied to special converters **14*a*–14, wherein the desired special channel allocation is carried out such that each video carrier is a predetermined odd multiple of the noninterfering side band frequency, here specifically defined, for purposes of example, as 4.25 MHz. If desired, the CATV head end may also include an independent source of audio and video signals as at 16. These signals are applied to a modulator 18 in which they respectively modulate a carrier signal at the standard video and audio IF frequencies. The output of modulator 18 is applied to an IF-to-VHF converter 20 similar to converters 14**.

The outputs of converters **14*a–n* and 20 are all applied to a VHF signal combiner 22 of the type known in the art, where the VHF outputs of the converters are combined into a single composite signal. The combined signal is transmitted over a single cable 24** to the subscribers' receivers connected at various points along the cable.

As stated above, the outputs of converters 14 and 20 each reflect the new carrier frequency determined in accord with the channel assignment system of the invention to achieve the desired minimization of the total bandwidth required for all channels, while still preventing perceptible interference at the subscribers' receivers which would otherwise result from second order harmonic products introduced into the system by the operation of the standard CATV single ended amplifiers.

Figure 2:
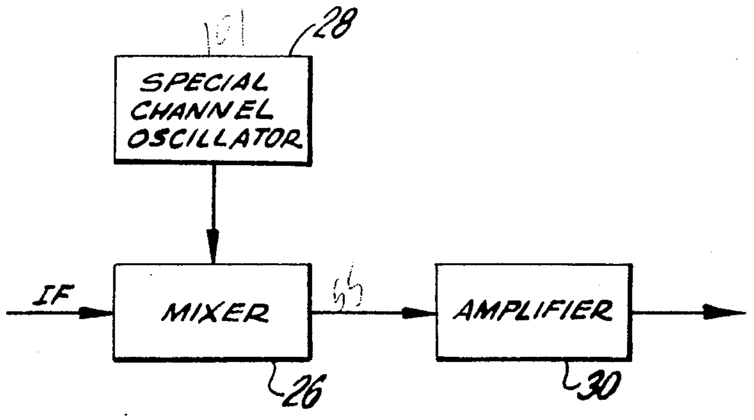
FIG. 2 is a schematic block diagram in greater detail of the IF-to-VHF converter of the system of FIG. 1.

This special channel assignment is performed in converters 14 (and 20). A typical converter, as illustrated in FIG. 2, comprises a mixer 26 which received the video and audio IF signals from converters 12 (and modulator 18). Mixer 26 also receives an RF signal from a special-channel oscillator 28 and heterodynes its two input signals to produce at its output the assigned channel having the selected video carrier. The output of mixer 26 is applied to an amplifier 30 the output of which is applied to one of the inputs of signal combiner 22.

The output frequency of oscillator 28 is different in each of converters 14 (and 20) and is selected such that the video-carrier output of each converter is different and at a different odd multiple of the preselected sideband frequency.

A typical channel assignment for 25 input channels is given in Table 1, in which the video carriers are respectively the 13th to the 61st multiple of the 4.25 MHz sideband frequency, each adjacent video carrier being separated by twice the sideband frequency, or 8.5 MHz. Similarly, the audio carriers formed for each 6 MHz channel in converters 14 are also equally spaced by 8.5 MHz as are the lower and upper edges of each channel.

TABLE 1.—SPECIAL CHANNEL FREQUENCY ASSIGNMENTS

| Channel | Odd multiples of 4.25 mHz. | Lower band edge mHz. | Video carrier mHz. | Sound carrier mHz. | Upper band edge mHz. |
|---|---|---|---|---|---|
| 1 | 13th | 54.0 | 55.25 | 59.75 | 60.0 |
| 2 | 15th | 62.5 | 63.75 | 68.25 | 68.5 |
| 3 | 17th | 71.0 | 72.25 | 76.75 | 77.0 |
| 4 | 19th | 79.5 | 80.75 | 85.25 | 85.5 |
| 5 | 21st | 88.0 | 89.25 | 93.75 | 94.0 |
| 6 | 23rd | 96.5 | 97.75 | 102.25 | 102.5 |
| 7 | 25th | 105.0 | 106.25 | 110.75 | 111.0 |
| 8 | 27th | 113.5 | 114.75 | 119.25 | 119.0 |
| 9 | 29th | 122.0 | 123.25 | 127.75 | 128.0 |
| 10 | 31st | 130.5 | 131.75 | 133.25 | 136.5 |
| 11 | 33rd | 139.0 | 140.25 | 144.75 | 145.0 |
| 12 | 35th | 147.5 | 148.75 | 153.25 | 153.5 |
| 13 | 37th | 156.0 | 157.25 | 161.75 | 162.0 |
| 14 | 39th | 164.5 | 165.75 | 170.25 | 170.5 |
| 15 | 41st | 173.0 | 174.25 | 178.75 | 179.0 |
| 16 | 43rd | 181.5 | 182.75 | 187.25 | 187.5 |
| 17 | 45th | 190.0 | 191.25 | 195.75 | 196.0 |
| 18 | 47th | 198.5 | 199.75 | 204.25 | 204.5 |
| 19 | 49th | 207.0 | 208.25 | 212.75 | 213.0 |
| 20 | 51st | 215.5 | 216.75 | 221.25 | 221.5 |
| 21 | 53rd | 224.0 | 225.25 | 229.75 | 320.0 |
| 22 | 55th | 232.5 | 233.75 | 238.25 | 238.5 |
| 23 | 57th | 241.0 | 242.25 | 246.75 | 247.0 |
| 24 | 59th | 249.5 | 250.75 | 255.25 | 255.5 |
| 25 | 61st | 258.0 | 259.25 | 263.75 | 264.0 |

To perform the special channel assignment, the oscillator 28 of converters 14 required to produce the special channel 1–25 frequency allocation as described in Table 1, must have an output frequency as set forth in Table 2 which follows:

TABLE 2

| Special Channel | Oscillator Frequency (MHz) | Special Channel | Oscillator Frequency (MHz) |
|---|---|---|---|
| 1 | 101.0 | 14 | 211.5 |
| 2 | 109.5 | 15 | 220.0 |
| 3 | 118.0 | 16 | 228.5 |
| 4 | 126.5 | 17 | 237.0 |
| 5 | 135.0 | 18 | 245.5 |
| 6 | 143.5 | 19 | 254.0 |
| 7 | 152.0 | 20 | 262.5 |
| 8 | 160.5 | 21 | 271.0 |
| 9 | 169.0 | 22 | 279.5 |
| 10 | 177.5 | 23 | 288.0 |
| 11 | 186.0 | 24 | 296.5 |
| 12 | 194.5 | 25 | 305.0 |
| 13 | 203.0 | | |

As will be noted, the output frequency of each of the special channel oscillators 28 is spaced by 8.5 MHz from that associated with an adjacent channel, and the mixing of the oscillator frequencies of Table 2 with the standard video and audio IF signals in mixer 26 produce the special channel video and audio carriers listed in Table 1.

Figure 3:
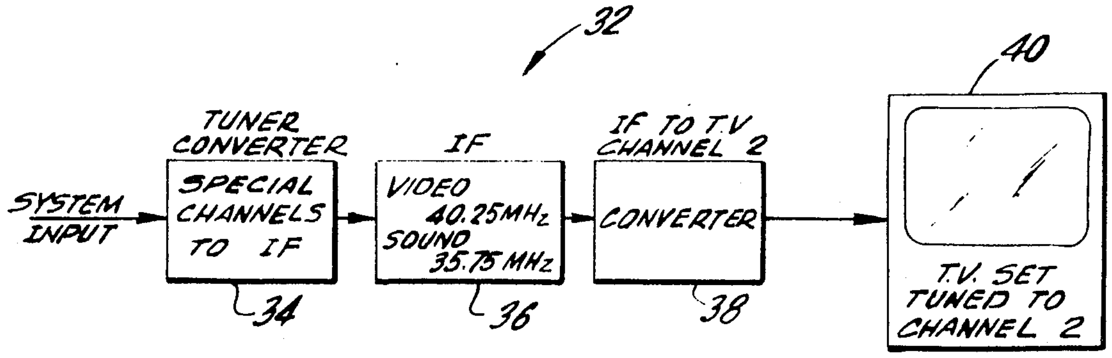
FIG. 3 is a schematic block diagram of an adapter provided at the receiver to permit reception of the specially allocated channels transmitted by the system of FIG. 1 at a standard television receiver.

For operation with the special channel assignment performed in the system of FIG. 1 each subscriber receiver will require a special adapter to reconvert the special channel frequencies to the standard TV broadcast channels. As shown in FIG. 3 the receiver adapter generally designated 32 includes an input converter 34 in which the special channel video and audio carriers are beat with an oscillator to produce received video and audio IF signals at 40.25 MHz and 35–75 MHz respectively, for the selected channel. The oscillator frequencies of converter 34 for producing these video and audio IF frequencies for operation on the special channel carrier frequencies listed in Table 1 are listed in Table 3.

TABLE 3

| Channel | Oscillator (MHz) | Channel | Oscillator (MHz) |
|---|---|---|---|
| 1 | 95.5 | 14 | 206.0 |
| 2 | 104.0 | 15 | 214.5 |
| 3 | 112.5 | 16 | 223.0 |
| 4 | 121.0 | 17 | 231.5 |
| 5 | 129.5 | 18 | 240.0 |
| 6 | 138.05 | 19 | 248.5 |
| 7 | 146.5 | 20 | 257.0 |
| 8 | 155.0 | 21 | 265.5 |
| 9 | 163.5 | 22 | 274.0 |
| 10 | 172.0 | 23 | 282.5 |
| 11 | 180.5 | 24 | 291.0 |
| 12 | 189.0 | 25 | 299.5 |
| 13 | 197.5 | | |

The output of converter 34 is applied to a standard IF stage 36, the output of which is applied to a frequency converter 38. The latter includes mixing and oscillator stages (not shown) to reconvert the IF output of stage 36 to the selected standard broadcast channels, here shown as channel 2. The output converter 38, representing the output of the receiver-adapter 32, is applied to a standard TV receiver 40 which is tuned to receive the selected channel.

The advantages of the channel allocation system of the invention can now be readily understood. Let us suppose that the subscriber wishes to receive channel 13. The adapter oscillator is set at 197.5 MHz. Since as can be seen in Table 1, the incoming video and audio carriers are 157.25 and 161.25 MHz respectively, the resultant video and audio IF signals derived in converter 34 are 40.25 MHz and 35.75 MHz as desired.

The nearest image frequency would be channel 22 having video and audio carriers of 233.75 and 238.25 MHz respectively which when heterodyned with the channel 13 oscillator, produces interference video and audio IF signals at 36.25 MHz and 40.75 MHz. The image frequency IF signals are thus at frequencies which produce minimum interference with the selected channel video and audio IF signals.

In addition, all second order beats between any of the selected channels all fall at the 4.25 MHz sideband of the desired channel, which, as noted above, produces no perceptible interference in the received signal at that channel.

For example, when channel 13 is the selected channel, the sum beat of the channel 3 video (72.25 MHz) and the channel 5 video (89.25 MHz) is 161.5 MHz, which falls 4.25 MHz above the special channel 13 video carrier. Similarly, the difference beat between the channel 22 video carrier (233.75 MHz) and the channel 3 video carrier (72.25 MHz) is also 161.5 MHz, as is the second harmonic of the channel 4 video carrier.

Similar analyses of the sum and the difference beats and second order harmonics for all specially assigned channels will reveal that the resultant second order beat will fall at 4.25 MHz in the sideband of one of the specially assigned channels.

In the above analysis, only the video carriers were considered as possible sources of interference on a cable system, since the sound carriers in such system are carried at reduced levels. As a result the possible interference caused by second order products of the audio carriers is considered to be below the perceptible level for single ended amplifier systems.

The system of the invention thus provides the ability to transmit a plurality of broadcast (e.g. TV) channels at a reduced overall bandwidth while avoiding any perceptible interference from second order effects at the receiver. Moreover, image frequency interference is also minimized. The benefits of the invention are obtained by minor modifications and additions to the head end of an otherwise conventional CATV head end, and the provision of a relatively inexpensive adapter unit at the receiver of each subscriber. The advantages obtained by permitting the transmission of an increased number of channels over a given bandwidth significantly outweighs the minor additional costs required for its achievement.

While the system of the present invention has been herein specifically described for use in a CATV system, it may be employed with equal facility and advantage in other multichannel television transmission systems such as MATV systems, cable television systems, and the like, whenever reduced bandwidth requirements are desired. Thus, while only a single embodiment of the invention is herein disclosed, it will be apparent that modifications may be made therein all without departing from the spirit and scope of the invention.

I claim:

1. In a system for receiving and then retransmitting a plurality of received broadcast television channels to a remote receiver over a reduced overall bandwidth, means for receiving a plurality of commercially broadcast television channels at known carrier frequencies, and means for converting the carriers of said broadcast television channels to a plurality of special channels having predetermined equally spaced special channel carriers, said special channel carriers being at selected odd multiples of a predetermined sideband frequency of said broadcast channels, whereby the second order harmonics of said special channel carriers all respectively fall at said predetermined sideband frequency of one of said plurality of special channels, and are substantially imperceptible at the received one of said broadcast channels.

2. The system of claim 1, in which said converting means includes second means for converting the received broadcast signals to a standard IF frequency, and third means coupled to said second converting means for converting said standard IF frequencies to said special channel carrier frequencies.

3. The system of claim 2, in which said third converting means comprises mixing means receiving said IF signals from said second converting means, and an oscillator coupled to said mixing means for producing signals at a predetermined frequency corresponding to said special channel carrier frequencies.

4. The system of claim 1, in which each of said special channels has a bandwidth of approximately 6 MHz, said sideband frequency being between 4.0 MHz and 4.5 MHz.

5. The system of claim 1, in which each of said special channels is 6 MHz in bandwidth, said sideband frequency being 4.25 MHz.

6. In combination with the system of claim 1, a receiver located remote from said system and including means for reconverting said special channel carrier frequencies to standard broadcast carrier frequencies for reception at said receiver.

7. In combination with the system of claim 3, a receiver located remote from said system and including means for reconverting said special carrier frequencies to standard broadcast carrier frequencies for reception at said receiver.

8. The combination of claim 7, in which said reconverting means includes second means for reconverting the received special channel carrier frequencies to receiver IF frequencies, and third means for reconverting said receiver IF frequencies to said standard carrier frequencies.

9. A multichannel transmitting method for improving the efficiency of utilization of the broadcast bandwidth, said method comprising the steps of receiving a plurality of standard commercial television channels, converting the carrier frequencies of said received television channels to produce a corresponding plurality of special channels having equally spaced special carrier frequencies different than the carrier frequencies of said television channels, each of said special carrier frequencies being an odd multiple of a selected sideband frequency less than the bandwidth of each of said channels, whereby the second order harmonics of said special channel carriers all fall at said sideband frequency in any of said special channels.

10. The method of claim 9, further comprising the steps of converting the received broadcast channels to standard IF frequencies, and thereafter converting said IF frequencies to said equally spaced special channel carrier frequencies.

* * * * *